(12) United States Patent
Mahajan et al.

(10) Patent No.: US 11,232,671 B1
(45) Date of Patent: Jan. 25, 2022

(54) SOCIALLY-BASED DYNAMIC REWARDS IN MULTIUSER ONLINE GAMES

(75) Inventors: Amitt Mahajan, San Francisco, CA (US); Roger F. Dickey, San Francisco, CA (US); Carl Eric Schiermeyer, Burlingame, CA (US); Jonathan Chang Tien, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 1689 days.

(21) Appl. No.: 12/873,010

(22) Filed: Aug. 31, 2010

Related U.S. Application Data

(60) Provisional application No. 61/247,540, filed on Sep. 30, 2009.

(51) Int. Cl.
*G07F 17/32* (2006.01)
*G06Q 20/36* (2012.01)

(52) U.S. Cl.
CPC .......... *G07F 17/32* (2013.01); *G06Q 20/363* (2013.01)

(58) Field of Classification Search
USPC .............................................. 463/42; 705/50
See application file for complete search history.

(56) References Cited

U.S. PATENT DOCUMENTS

| | | | |
|---|---|---|---|
| 6,375,568 B1 * | 4/2002 | Roffman et al. ................. | 463/26 |
| 7,682,239 B2 | 3/2010 | Friedman et al. | |
| 7,955,175 B1 | 6/2011 | Holloway et al. | |
| 8,151,199 B2 | 4/2012 | Gerson et al. | |
| 8,348,767 B2 | 1/2013 | Mahajan et al. | |
| 2002/0094870 A1 * | 7/2002 | Murray ........................... | 463/42 |
| 2003/0074265 A1 * | 4/2003 | Oshima .................. | G06Q 30/02 705/26.1 |
| 2004/0166918 A1 * | 8/2004 | Walker et al. .................. | 463/16 |
| 2004/0259641 A1 * | 12/2004 | Ho ................... | 463/42 |
| 2005/0014554 A1 | 1/2005 | Walker et al. | |
| 2005/0026695 A1 * | 2/2005 | Tsuchiyama ............ | A63F 13/52 463/42 |
| 2005/0143174 A1 | 6/2005 | Goldman et al. | |
| 2006/0116194 A1 | 6/2006 | Pacey et al. | |
| 2007/0099685 A1 | 5/2007 | Van Luchene | |

(Continued)

FOREIGN PATENT DOCUMENTS

| | | | | |
|---|---|---|---|---|
| CA | 2705782 A1 * | 5/2009 | ............. | G07F 17/32 |

OTHER PUBLICATIONS

Sato, Yuji ; Akatsuka, Yosuke ; Nishizono, Takenori Reward allotment in an event-driven hybrid learning classifier system for online soccer games; ACM Digital Library, Proceedings of the 8th annual conference on genetic and evolutionary computation, 2006, p. 1753-1760.*

(Continued)

*Primary Examiner* — Isidora I Immanuel
(74) *Attorney, Agent, or Firm* — Schwegman Lundberg & Woessner, P.A.

(57) ABSTRACT

The present disclosure relates to games and applications in general and in particular to computer-implemented online games, such as online role-playing games, playable by more than one person from more than one location. The game engine can dynamically determine the type of in-game asset to award to a first player and the types of in-game obstacles to present to the first player by referencing the in-game assets available to other players in the first player's social network and by referencing other game state variables.

9 Claims, 7 Drawing Sheets

(56) References Cited

U.S. PATENT DOCUMENTS

| | | | |
|---|---|---|---|
| 2007/0129141 A1* | 6/2007 | Walker et al. | 463/25 |
| 2007/0129148 A1 | 6/2007 | Van Luchene | |
| 2007/0244757 A1* | 10/2007 | Walter | 705/14 |
| 2007/0259713 A1 | 11/2007 | Fiden et al. | |
| 2008/0146334 A1 | 6/2008 | Kil | |
| 2008/0153595 A1 | 6/2008 | Chickering et al. | |
| 2008/0167118 A1* | 7/2008 | Kroeckel | G07F 17/3244 463/1 |
| 2008/0227553 A1* | 9/2008 | Leifenberg et al. | 463/42 |
| 2008/0234043 A1* | 9/2008 | McCaskey et al. | 463/29 |
| 2009/0131158 A1 | 5/2009 | Brunet De et al. | |
| 2009/0187856 A1* | 7/2009 | Rapo et al. | 715/810 |
| 2009/0239666 A1* | 9/2009 | Hall et al. | 463/42 |
| 2009/0253517 A1* | 10/2009 | Bererton et al. | 463/42 |
| 2009/0305774 A1* | 12/2009 | Farone et al. | 463/25 |
| 2009/0318221 A1 | 12/2009 | Dhunjishaw et al. | |
| 2010/0030578 A1* | 2/2010 | Siddique | G06Q 40/12 705/3 |
| 2010/0035692 A1 | 2/2010 | Reville et al. | |
| 2010/0048305 A1* | 2/2010 | Koplin | 463/43 |
| 2010/0056280 A1* | 3/2010 | Langan et al. | 463/42 |
| 2010/0062840 A1* | 3/2010 | Herrmann | 463/25 |
| 2010/0113154 A1 | 5/2010 | Leingang | |
| 2010/0114664 A1 | 5/2010 | Jobin | |
| 2010/0169800 A1* | 7/2010 | Lance et al. | 715/757 |
| 2010/0191770 A1* | 7/2010 | Cho et al. | 707/783 |
| 2010/0203963 A1* | 8/2010 | Allen et al. | 463/30 |
| 2010/0216553 A1* | 8/2010 | Chudley et al. | 463/42 |
| 2010/0279764 A1* | 11/2010 | Allen et al. | 463/25 |
| 2010/0304862 A1 | 12/2010 | Coleman et al. | |
| 2011/0081967 A1 | 4/2011 | Butcher et al. | |
| 2011/0107239 A1 | 5/2011 | Adoni et al. | |
| 2011/0124415 A1 | 5/2011 | Shimono | |
| 2011/0207525 A1 | 8/2011 | Allen et al. | |
| 2011/0218035 A1 | 9/2011 | Thomas | |
| 2011/0300926 A1 | 12/2011 | Englman et al. | |
| 2012/0004038 A1 | 1/2012 | Van Luchene | |
| 2012/0015742 A1 | 1/2012 | Vanbragt et al. | |
| 2012/0015746 A1 | 1/2012 | Mooney et al. | |
| 2012/0077580 A1 | 3/2012 | Mahajan et al. | |

OTHER PUBLICATIONS

U.S. Appl. No. 13/244,829, Restriction Requirement dated Feb. 22, 2012, 6 pgs.

"U.S. Appl. No. 13/244,829, Notice of Allowance dated Sep. 26, 2012", 8 pgs.

"U.S. Appl. No. 13/244,829, Examiner Interview Summary dated Aug. 6, 2012", 3 pgs.

"U.S. Appl. No. 13/244,829, Non Final Office Action dated May 2, 2012", 21 pgs.

"U.S. Appl. No. 13/244,829, Response filed Aug. 2, 2012 to Non Final Office Action dated May 2, 2012", 12 pgs.

* cited by examiner

SOCIALLY-BASED DYNAMIC REWARDS IN MULTIUSER ONLINE GAMES

CROSS-REFERENCE TO RELATED APPLICATION

The present application claims priority to U.S. Provisional Application Ser. No. 61/247,540 filed Sep. 30, 2009, which is incorporated by reference in its entirety for all purposes.

TECHNICAL FIELD

The present disclosure relates to games and applications in general and in particular to computer-implemented online games, such as online role-playing games (RPGs), playable by more than one person from more than one location.

BACKGROUND

In many games, there is a virtual world or some other imagined playing space where a player of the game controls one or more player characters (herein "character," "player character," or "PC"). Player characters can be considered in-game representations of the controlling player. As used here, the terms "player," "user," "entity," and "friend" may refer to the in-game player character controlled by that player, user, entity, or friend, unless context suggests otherwise. A game display can display a representation of the player character. A game engine accepts inputs from the player, determines player character actions, decides outcomes of events, and presents the player with a game display illuminating what happened. In some games, there are multiple players, wherein each player controls one or more player characters.

In many computer games, there are various types of in-game assets (aka "rewards" or "loot") that a player character can obtain within the game. For example, a player character may acquire game points, gold coins, experience points, character levels, character attributes, virtual cash, game keys, or other in-game items of value. In many computer games, there are also various types of in-game obstacles that a player must overcome to advance within the game. In-game obstacles can include tasks, puzzles, opponents, levels, gates, actions, etc. In some games, a goal of the game may be to acquire certain in-game assets, which can then be used to complete in-game tasks or to overcome certain in-game obstacles. For example, a player may be able to acquire a virtual key (i.e., the in-game asset) that can then be used to open a virtual door (i.e., the in-game obstacle).

An electronic social networking system typically operates with a social networking server or servers providing interaction between users such that a user can specify other users of the social networking system as "friends." As should be apparent, a collection of users and the "friend" connections between users can form a social graph that can be traversed to find second, third and more remote connections between users, much like a graph of nodes connected by edges can be traversed.

DESCRIPTION OF EXAMPLE EMBODIMENTS

Figure 1:
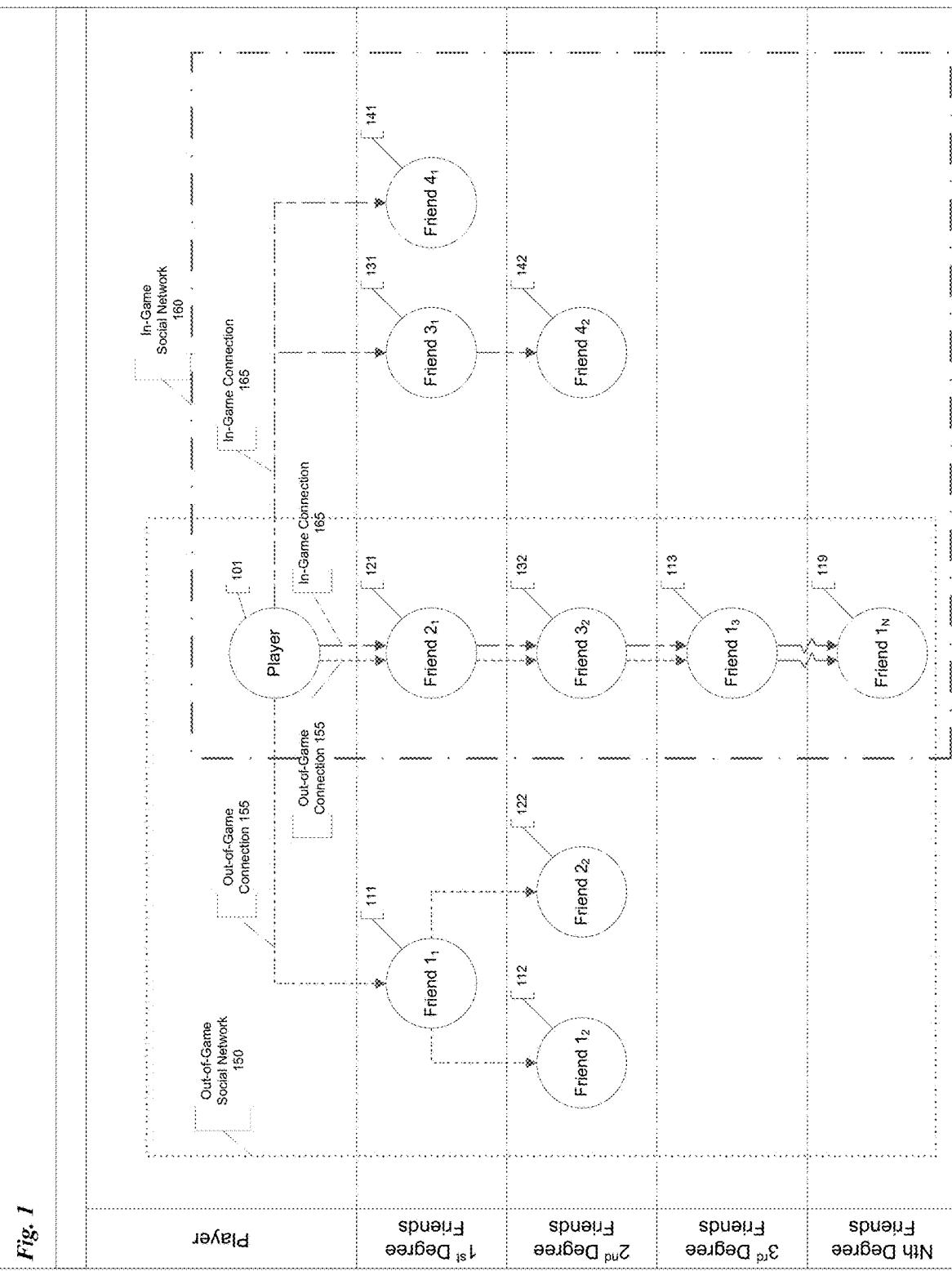
FIG. 1 illustrates a schematic of an in-game social network and an out-of-game social network.

Game Systems, Social Networks, and Social Graphs:

In an online multiplayer game, players control player characters (PCs), a game engine controls non-player characters (NPCs) and game features, and the game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Game state encompasses the notion of player character state and refers to any parameter value that characterizes the state of an in-game element, such as a non-player character, a virtual object (such as a wall or castle), etc. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

A game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. The social graph has a node for each entity, and edges to represent relationships between entities. A node in a social graph can represent any entity. In some embodiments, a unique client identifier can be assigned to each user in the social graph. The present disclosure assumes that at least one entity of a social graph is a player or player character in an online multiplayer game, though the present disclosure is intended to cover all types of social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within $N_{max}$ degrees of the player, where $N_{max}$ is the maximum degree of separation allowed by either the social networking system 520a or the game system 520b. In one embodiment, $N_{max}$ equals 1, such that the player's social network includes only first-degree friends. In another embodiment, $N_{max}$ is unlimited and the player's social network is coextensive with the social graph.

In one embodiment, the social graph is managed by the game networking system 520b, which is managed by the game operator. In another embodiment, the social graph is part of a social networking system 520a managed by a third-party (e.g., Facebook, Friendster, Myspace, etc.). In yet another embodiment, a player has a social network on both the game networking system 520b and the social networking system 520a, wherein the player can have a social network on the game networking system 520b that is a subset, superset, or independent of the player's social network on the social networking system 520a. In such combined systems, the game network system 520b can maintain social graph information with edge type attributes that indicate whether a given friend is an "in-game friend," a "social network friend," or both. The various embodiments disclosed herein are operable when the social graph is managed by a social networking system 520a, a game networking system 520b, or both.

Out-of-Game and In-Game Social Networks

FIG. 1 shows an example of an out-of-game social network 150 within a social graph. As shown, Player 101 can be associated, connected or linked to various other users, or "friends," within the social network 150. These associations, connections or links can track relationships between users within the social network 150 and are commonly referred to as online "friends" or "friendships" between users. Each friend or friendship in a particular user's social network within a social graph is commonly referred to as a "node." The details of social network 150 will be described in relation to an original, first, or primary player, e.g., Player 101. As used herein, the terms "player" and "user" can be used interchangeably and can refer to any user or character in an online multiuser game system or social networking system. As used herein, the term "friend" means any node within a player's social network.

As shown in FIG. 1, Player 101 has direct connections with several friends. When Player 101 has a direct connection with another individual that connection is referred to as a first-degree friend. In social network 150, Player 101 has two first-degree friends. That is, Player 101 is directly connected to Friend $1_1$ 111 and Friend $2_1$ 121. In a social graph, it is possible for individuals to be connected to other individuals through their first-degree friends (i.e., friends of friends). As described above, each edge required to connect a player to another user is considered the degree of separation. For example, FIG. 1 shows that Player 101 has three second-degree friends to which he is connected via his connection to his first-degree friends. Second-degree Friend $1_2$ 112 and Friend $2_2$ 122 are connected to Player 101 via his first-degree Friend $1_1$ 111. The limit on the depth of friend connections, or the number of degrees of separation for associations, that Player 101 is allowed is typically dictated by the restrictions and policies implemented by social networking system 520a.

In various embodiments, Player 101 can have Nth-degree friends connected to him through a chain of intermediary degree friends as indicated in FIG. 1. For example, Player 101 also has 3rd-degree (e.g., Friend $1_3$ 113), and Nth-degree (e.g., Friend $1_N$ 119) friends. Various embodiments may take advantage of and utilize the distinction between the various degrees of friendship relative to Player 101.

Connections between Player 101 and other entities in the social graph can be built in several ways. In some embodiments, Player 101 can invite various entities into his first-degree friends category within the infrastructure of a social network website or other server. In other embodiments, Player 101 can invite entities to join a social graph or network from within an online multiplayer game. In yet other embodiments, Player 101 can invite anyone from his out-of-game social network 150 to join an in-game social network 160 within a separate or connected online multiuser game.

In various embodiments, a player (or player character) can have a social graph within an online multiplayer game that is maintained by the game engine and another social graph maintained by a separate social networking system. FIG. 1 depicts a schematic example of an in-game social network 160 and an out-of-game social network 150. In this example, Player 101 has out-of-game connections 155 to a plurality of friends, forming an out-of-game social network 150. Here, Friend $1_1$ 111 and Friend $2_1$ 121 are first-degree friends with Player 101 in his out-of-game social network 150. Player 101 also has in-game connections 165 to a plurality of players, forming an in-game social network 160. Here, Friend $2_1$ 121, Friend $3_1$ 131, and Friend $4_1$ 141 are first-degree friends with Player 101 in his in-game social network 160. In some embodiments, it is possible for a friend to be in both the out-of-game social network 150 and the in-game social network 160. Here, Friend $2_1$ 121 has both an out-of-game connection 155 and an in-game connection 165 with Player 101, such that Friend $2_1$ 121 is in both Player 101's in-game social network 160 and Player 101's out-of-game social network 150.

As with other social networks, Player 101 can have second-degree and higher-degree friends in both his in-game and out of game social networks. In some embodiments, it is possible for Player 101 to have a friend connected to him both in his in-game and out-of-game social networks, wherein the friend is at different degrees of separation in each network. For example, if Friend $2_2$ 122 had a direct in-game connection with Player 101, Friend $2_2$ 122 would be a second-degree friend in Player 101's out-of-game social network, but a first-degree friend in Player 101's in-game social network. A multiuser online game can access both in-game social networks 160 and out-of-game social networks 150, and the embodiments disclosed herein are operable using either or both.

In various embodiments, the connections in a player's in-game social network can be formed both explicitly (e.g., users must "friend" each other) and implicitly (e.g., system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

In-Game Assets and In-Game Obstacles

In various embodiments, an online multiplayer game can provide a mechanism for player characters to acquire in-game assets. In-game assets can be acquired automatically. For example, a player character in an online role-playing game may automatically be given a sword and armor when initiating an instance of the game. In-game assets can also be acquired after certain conditions are met, such as overcoming an in-game obstacle. For example, a player character in an online role-playing game may be able to acquire a magic staff once he has defeated a virtual wizard. In another example, a player character in an online treasure hunting game may be able to acquire a virtual treasure chest once he has dug in a specific spot on a desert island. In-game assets can also be acquired directly from the game operator. For example, a player could exchange virtual currency or legal currency for a desired in-game asset. In-game assets can also be acquired from other player characters in the game, where a player may be able to gift or transfer one or more in-game assets from his player character to another player character. For example, Player 101 may have a virtual ruby gemstone, which he can transfer to Friend $2_1$ 121 or another friend his Player 101's social network. A player character's transferable ("giftable") in-game assets may be a subset, a superset, or independent of the player character's in-game assets. One of ordinary skill in the art will recognize that in-game assets can be awarded to player characters under a variety of conditions using a variety of mechanisms.

In various embodiments, an in-game asset can provide an in-game benefit for the player character, such as increasing the player character's likelihood or ability to advance in the game. For example, assets could be character levels, ability points, skill points, hit points, mana points, combat bonuses, etc. Assets can also be virtual representations of real life things such as cash, precious valuables, personal property, real property, weapons, vehicles, titles, jobs, etc. Assets can also include mythical and fantasy things, such as manna, game keys, magical items, potions, relics, artifacts, etc. Typical in-game benefits include special abilities, enchanted items, or game keys, wherein these benefits may allow the player character to advance at a more rapid rate or satisfy a gate condition that allows the player character to advance past a certain point in the game. Benefits may also include in-game authority, rights, or status.

In some embodiments, the game engine can track (e.g., in a database) the in-game assets of a Player 101's player character. The game engine can also track the in-game assets of other player characters in the multiuser online game, including the player characters of friends in Player 101's social network (his in-game social network 160, out-of-game social network 150, or both).

In various embodiments, an online multiplayer game has a game mechanic wherein a player must overcome one or more in-game obstacles to advance game play. In some embodiments, a player character can only overcome certain in-game obstacles by using one or more in-game assets. These are the so-called "asset requirements" for the obstacles. An asset requirement can include one or more in-game assets, one or more types of in-game assets, or any combination thereof. One of ordinary skill in the art will recognize that the asset requirement can comprise various asset combinations. The game engine can provide a variety of mechanisms by which a player character can overcome an obstacle once the asset requirement has been satisfied. For example, the player may have to click on a virtual lock, causing his player character to insert a virtual key into the lock, thereby opening it.

Dynamically Generating In-Game Assets

In various embodiments, the game engine can generate an in-game asset for a player of an instance of an online game. The game engine can determine the in-game asset to generate by a variety of methods (e.g., statically, randomly, dynamically, etc.). The game engine can determine and generate in-game assets at any time (e.g., when the player initiates an instance of the game, when the player earns the asset, etc.).

Static Asset Generation

In some embodiments, the in-game assets that a player character can acquire are statically set by the game engine. For a specific instance of an online game, the game engine will always generate the same in-game asset. For example, Player 101 may always acquire a Potion of Regeneration when defeating a troll. In another example, Player 101 may always acquire a green gem key when opening a certain treasure chest.

Random Asset Generation

In other embodiments, the in-game assets that a player can acquire can be randomly determined by the game engine. When generating an in-game asset, the game engine may execute an asset generation function that consists of generating a random number. In this case, the algorithm for the asset generation function would be:

$f_{asset}=f(R)$ where:

$f_{asset}$ is the asset generation function, and

R is a random number.

Once the random number is generated, the game engine can reference the random number against a table of possible in-game assets. For example, Player 101 may earn an in-game asset for defeating a goblin in an online role-playing game. After Player 101 defeats the goblin, the game engine may generate a random number between 1 and 100 and then reference a random treasure generation table to determine the in-game asset to award to Player 101. The following is an example of such a table:

TABLE 1

Example Treasure Generation Table

| $f_{asset}$ | In-Game Asset Generated |
|---|---|
| 1-40 | Potion of Healing (value = 10 virtual coins) |
| 41-70 | Scroll of Cure Moderate Wounds (value = 200 virtual coins) |
| 71-90 | Ring of Regeneration (value = 1,000 virtual coins) |
| 91-97 | Staff of Curing (value = 8,000 virtual coins) |
| 98-100+ | Wand of Orcus (value = 100,000 virtual coins) |

In this example table, higher random numbers are needed to receive more valuable in-game assets, and the probability of receiving less valuable assets is greater than the probability of receiving more valuable assets, however other arrangements are possible. Here, if the asset generation function randomly generates the number 68, then the game engine would reference Table 1 and generate a Scroll of Cure Moderate Wounds for Player 101. Alternatively, if the asset generation function randomly generates the number 99, then Player 101 would receive the Wand of Orcus. Other methods of randomly determining in-game assets are also possible and this is merely one example.

Dynamic Asset Generation

Figure 2:
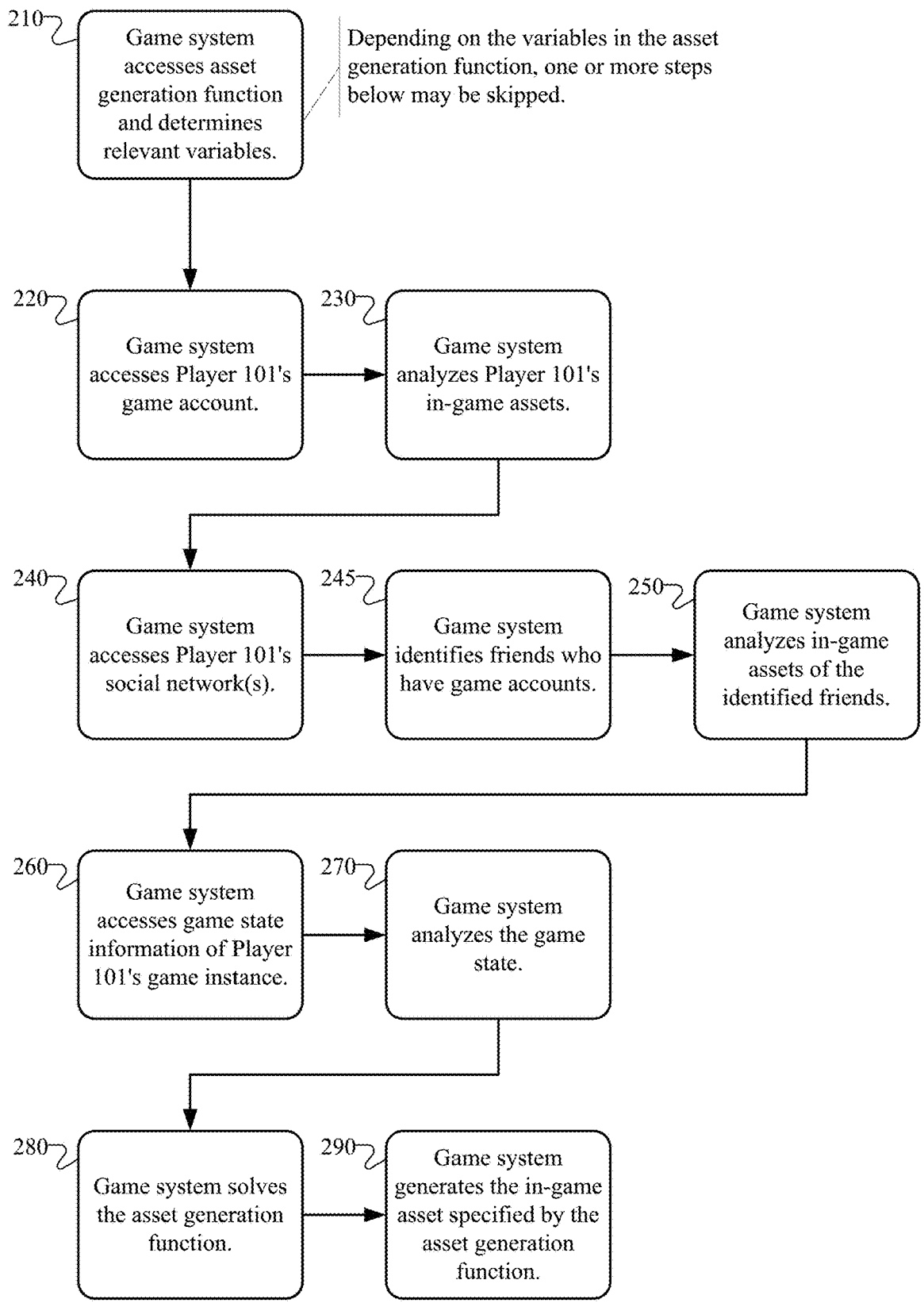
FIG. 2 shows a flowchart illustrating an example method for dynamically generating in-game assets.

FIG. 2 shows a flowchart illustrating an example method for dynamically generating in-game assets. In various embodiments, the in-game assets that a player can acquire can be dynamically determined by the game engine based on a variety of factors. When generating an in-game asset for a specific instance of an online game, the game engine can consider Player 101's in-game assets, the in-game assets of other players in Player 101's social network (including in-game social network 160 and out-of-game social network 150), other game state information, random numbers, and possibly other variables. The following is an example algorithm the game engine could execute to determine an in-game asset:

$$f_{asset} = f(P_{asset}^{101}, F_{asset}^{1}, \ldots, F_{asset}^{N}, X_{state}^{1}, \ldots, X_{state}^{N}, R)$$

where:
$f_{asset}$ is the asset generation function,
$P_{asset}^{101}$ is Player 101's in-game assets, ($F_{asset}^{1}, \ldots, F_{asset}^{N}$) are the in-game assets of Player 101's friends, ($X_{state}^{1}, \ldots, X_{state}^{N}$) are other game state variables, and R is a random number.

As described previously, the game engine may generate in-game assets at any time. When generating an in-game asset, the game system may execute method 200. First, the game system will access the asset generation function at step 210 to determine what in-game asset to award to Player 101. Depending on the variables in the asset generation function, the game system can execute a variety of steps to solve the function. The game system can access Player 101's game account at step 220, and then identify and analyze the in-game assets owned by his player character at step 230. The game system can then access Player 101's social networks at step 240, including his in-game social network 160 and his out-of-game social network 150. The game system can then identify the friends in Player 101's social network who also have player characters in the game at step 245, and then identify and analyze the in-game assets owned by these player characters at step 250. The game system can analyze friends in Player 101's social network to any degree (e.g., 1st degree friends, 2nd degree friends, Nth degree friends). The game system can then access game state information associated with the current instance of the game at step 260, and then identify and analyze relevant game state parameters at step 270. Once all relevant variables have been identified and analyzed in steps 220 through 270, they can be inputted into the asset generation function, which can now be solved at step 280. If the asset generation function includes a random number as a variable, this number can be generated at step 280 as part of solving the asset generation function. The asset generation function may inherently specify the in-game asset to generate, or it may merely equal a number or other variable that must be references against a table or list which specifies the asset to generate. Once the asset generation function is solved, the game system can then generate the appropriate in-game asset, which can then be acquired by Player 101.

One of ordinary skill in the art will recognize that the asset generation function and the method for implementing it described above is merely an example, and that various other algorithms, variables, and methods can be use to determine and generate in-game assets.

The variables of the asset generation function can be given various weights in order to achieve specific outcomes. The asset generation function may be biased for or against generating certain in-game assets based on these variables. Examples of how these variables can affect the asset generation function are given in the following sections.

Asset Generation Based on the Player's In-Game Assets

In one embodiment, the game engine could reference Player 101's in-game assets when executing the asset generation function. For example, if the asset generation function randomly generates the number 33, but Player 101 already has a Potion of Healing, the asset generation function may ignore the result and generate a second random number. The game engine would then reference Table 1 and generate the in-game asset associated with this second random number. In another example, if Player 101 already has a Potion of Healing, the asset generation function may add +20 to the random number generated by the asset generation function, so that if the random number is 33, the asset generation function would add 20 so that the final number would be 53 and Player 101 would receive a Scroll of Cure Moderate Wounds. In yet another example, if Player 101 already has a Potion of Healing, the asset generation function may generate a random number but, instead of referencing Table 1, instead reference another treasure generation table that does not include a Potion of Healing. In another embodiments, the game engine can adjust the value ranges associated with one or more of the in-game assets in Table 1 to adjust the probability that certain in-game assets are selected by the asset generation function.

Asset Generation Based on Assets Available in the Player's Social Network

In one embodiment, the game engine could reference the inventory of in-game assets held by other players in Player 101's social network when executing the asset generation function. For example, if Friend $2_1$ 121 already has a Wand of Orcus, the asset generation function may only generate random numbers between 1 and 98. In another example, the asset generation function may still generate numbers between 1 and 100, but if the first random number is between 98 and 100, it may ignore that result and generate a second random number and award the in-game asset associated with this second number. In a variation of this example, the game engine may continue to repeat the method until it generates a number below 98. In yet another example, the game engine may take the result of the asset generation function and reference it against a treasure generation table that does not include the Wand of Orcus. In another embodiment, the game engine could reference the types of in-game assets that other players in Player 101's social network have the ability to gift or transfer to Player 101 when executing the asset generation function.

Asset Generation Based on Game State

In one embodiment, the game engine could reference game state information when executing the asset generation function. As used herein, game state includes all game parameters that are not related to a player character's in-game assets. Game state can include parameters tracked or controlled by the game engine (e.g., internal game clocks, game environment, NPC state, etc.). Game state can also include game parameters controlled by other player characters (e.g., where Friend $2_1$ 121 has overcome a specific in-game obstacle). For example, if Player 101 defeats a goblin, the asset generation function may subtract −1 from the random number generated by the game engine for each second it took for Player 101 to complete the virtual battle and then reference Table 1. Therefore, the longer it takes Player 101 to defeat his enemy, the less likely it will be that he earns a more valuable in-game asset.

In some embodiments, the game state information used as a variable in the asset generation function is information about one or more in-game obstacles in an instance of the online game. Game state information about in-game obstacles could include the proximity of the obstacle to a player character, the relative difficulty of the obstacle, the asset requirements for overcoming the obstacle, etc. For example, if Player 101's player character opens a treasure chest in a room adjacent to the den of a poisonous giant snake, the asset generation function may increase the likelihood of generating a Potion of Poison Resistance. Alternatively, the asset generation function may decrease the likelihood of generating a Potion of Poison Resistance, thereby forcing Player 101 to acquire the in-game asset by other means (e.g., buying the asset from the game operator, asking an in-game friend to transfer or gift the asset, etc.).

In some embodiments, the game engine may generate one or more in-game assets for a player after the player overcomes certain in-game obstacles. For example, the asset generation function may generate more valuable in-game assets when more difficult obstacles are overcome. If Player 101 defeats a virtual monster, the asset generation function may then generate a random number and add +1 to the random number for each hit point the virtual monster had and then reference Table 1. Therefore, the more powerful the enemy that Player 101 defeats, the greater the probability that Player 101 will receive a more valuable asset.

Dynamically Generating In-Game Obstacles

In various embodiments, the game engine can generate an in-game obstacle that is presented to a player of an instance of an online game. The game engine can determine the in-game obstacle by a variety of methods (e.g., statically, randomly, dynamically, etc.). The game engine can determine and generate in-game obstacles at any time (e.g., when the player initiates an instance of the game, as the player progresses through the game, etc.).

In various embodiments, the determination and generation of in-game obstacles is analogous to the methods for generating in-game assets described above. In-game obstacles can be dynamically determined by the game engine based on a variety of factors. When generating an in-game obstacle for a specific instance of an online game, the game engine can consider Player 101's in-game assets, the in-game assets of other players in Player 101's social network (including in-game social network 160 and out-of-game social network 150), other game state information (including other in-game obstacles), random numbers, and possibly other variables. The following is an example algorithm the game engine could execute to determine an in-game obstacle:

$$f_{obstacle} = f(P_{asset}^{101}, F_{asset}^{1}, \ldots, F_{asset}^{N}, X_{state}^{1}, \ldots, X_{state}^{N}, R)$$

where:
$f_{obstacle}$ is the obstacle generation function,
$P_{asset}^{101}$ is Player 101's in-game assets,
$(F_{asset}^{1}, \ldots, F_{asset}^{N})$ are the in-game assets of Player 101's friends,
$(X_{state}^{1}, \ldots, X_{state}^{N})$ are other game state variables, and
R is a random number.

The game engine may generate in-game obstacles at any time. When generating an in-game obstacle, the game system may execute a method analogous to method 200 described above. The game system can determine all the relevant variables for the obstacle generation function and then solve the function. The obstacle generation function may inherently specify the in-game obstacle to generate, or it may merely equal a number or other variable that must be references against a table or list which specifies the obstacle to generate. Once the obstacle generation function is solved, the game system can then generate the appropriate in-game obstacle, which may later be encountered by Player 101.

One of ordinary skill in the art will recognize that the obstacle generation function and the method for implementing it described above is merely an example, and that various other algorithms, variables, and methods can be use to determine and generate in-game obstacles.

The variables of the obstacle generation function can be given various weights in order to achieve specific outcomes. The obstacle generation function may be biased for or against generating certain in-game obstacles based on these variables.

Obstacle Generation Based on the Player's In-Game Assets

In one embodiment, the game engine could reference Player 101's in-game assets when executing the obstacle generation function. For example, if Player 101 possesses a certain in-game asset (e.g., a gold key), the obstacle generation function may be more likely to generate a corresponding in-game obstacle (e.g., a gold door, which can only be unlocked with a gold key), thereby ensuring Player 101 can continue to advance in the game. In another example, if Player 101 possesses a certain in-game asset (e.g., a blue key), the obstacle generation function may be more likely to generate an in-game obstacle that cannot be overcome with that in-game asset (e.g., a gold door), thereby forcing Player 101 to pursue other paths in the game or possibly forcing Player 101 to purchase the in-game asset from the game operator.

Obstacle Generation Based on Assets Available in the Player's Social Network

In one embodiment, the game engine could reference the inventory of in-game assets held by other players in Player 101's social network when executing the obstacle generation function. For example, if Friend $2_1$ 121 has a certain in-game asset (e.g., a gold key), the obstacle generation function may be more likely to generate a corresponding in-game obstacle (e.g., a gold door). In this example, Player 101 may be able to gain access to Friend $2_1$ 121's in-game asset through a variety of means (e.g., Friend $2_1$ 121 may loan the gold key to Player 101), thereby allowing Player 101 to overcome the in-game obstacle. In another embodiment, the game engine could reference the types of in-game assets that other players in Player 101's social network have the ability to gift to Player 101 when executing the obstacle generation function.

Obstacle Generation Based on Game State

In one embodiment, the game engine could reference game state information when executing the obstacle generation function. For example, if Player 101 is engaged in a specific game instance (e.g. exploring a barren desert), the obstacle generation function may be less likely to generate in-game obstacle that are inappropriate for that instance (e.g., a rabid merman).

Example: Treasure Hunting Game

In one embodiment, a player controls a player character in a virtual treasure hunting adventure game. The player (via his player character) can visit various islands and dig or otherwise search for hidden treasure. Various islands have locks or barriers that can only be bypassed using certain keys or other in-game assets. Each player character also has a so-called "home island," where each game instance is initiated.

Figure 3:
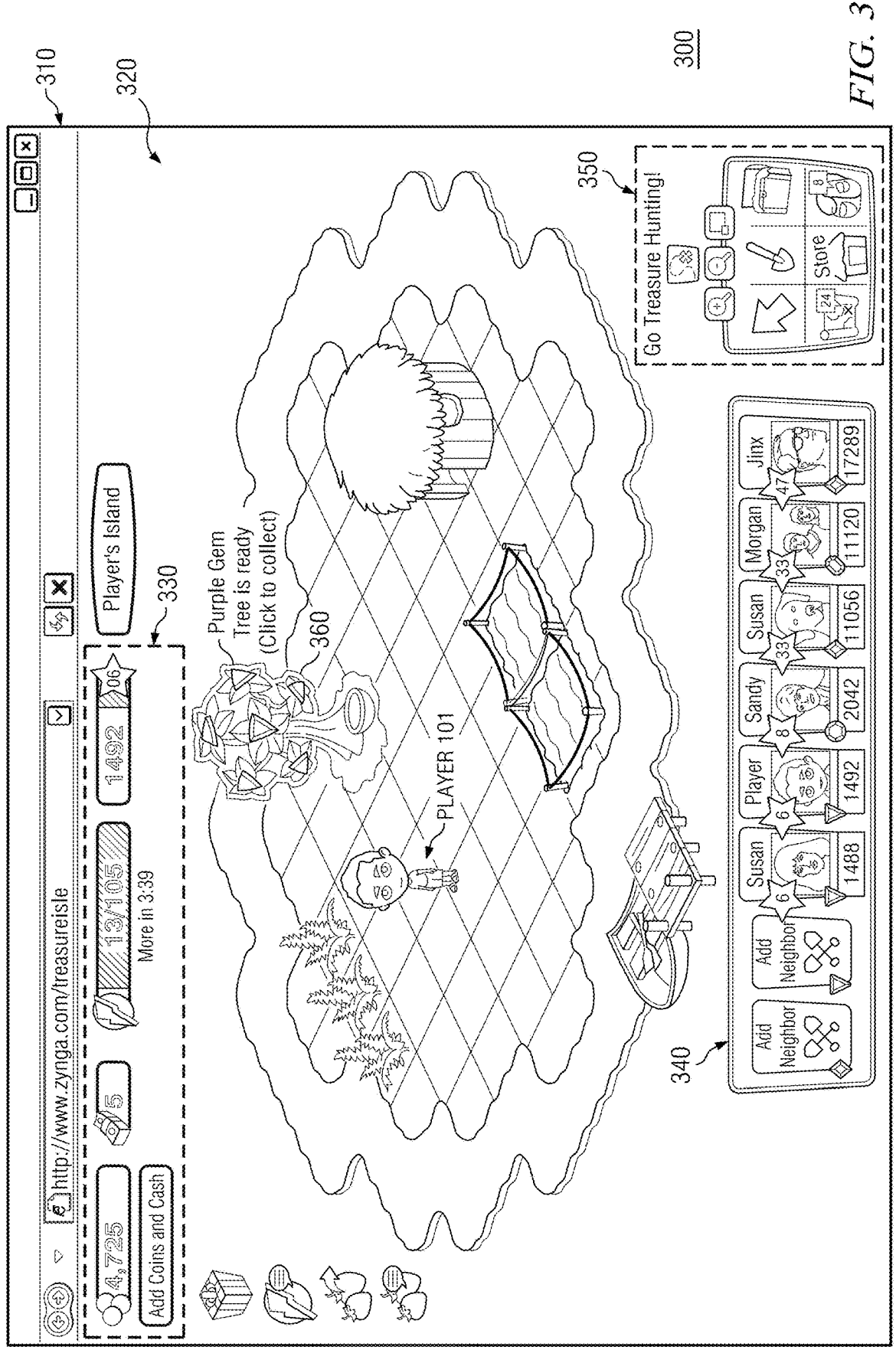
FIG. 3 shows an example of a user interface display for an online game.

FIG. 3 illustrates an example of a home island with a type of key generator in an online treasure hunting game. Here, Player 101 is accessing the treasure hunting game via a browser client 310, which presents the game interface 320. The game interface 320 shows Player 101's player character on his "home island." Player 101's home island contains a purple gem tree 360, which is a type of key generator. A key generator is an in-game asset that produces game keys, which are also a type of in-game asset. Each type of key generator produces game keys of a specific type. For example, purple gem tree 360 produces purple gems. Other types of gem trees (orange, red, blue, and purple) produce corresponding types of gems (orange, red, blue, and purple, respectively). A game key is a type of in-game asset that can be used to overcome in-game obstacles or to provide access to other in-game features. For example, purple gems can be used to open locks (i.e., in-game obstacles) that have an asset requirement that includes one or more purple gems.

If Player 101 clicks on the purple gem tree 360, his player character will move to the tree and harvest gems from the tree. The purple gems are then removed from the tree and transferred to Player 101. In this embodiment, the player character will collect two purple gems. The player character will also place multiple gems in the basket next to the tree. Other players within Player 101's social network can then visit Player 101's island to collect purple gems for their own use. Gem trees periodically generate new gems, which can then be harvested again.

The game interface 320 displays all the friends from Player 101's in-game social network 160 in box 340. Here, Player 101 has five other friends from his in-game social network 160 who also play the treasure hunting game and have formed an explicit in-game connection 165.

Each player's home island has a gem tree that produces gems. The type of gem tree is selected by the game engine when the player first establishes a game account. To determine the type of gem tree to generate on a new player's home island, the game system uses a variant of the asset generation function described previously called the gem tree generation function. The variables of this gem tree generation function are the gem trees associated with the first-degree friends in the new player's out-of-game social network 150. The gem tree generation function is a pseudo-random function that increases the probability of generating types of gem trees that are less common in the new player's social network. For example, if none of Player 101's friends have purple gem trees, the asset generation function is more likely to generate a purple gem tree. The following is an example algorithm the game engine could execute to determine the type of gem tree to generate for a new player:

$$f_{tree} = f(F_{tree}^1, \ldots, F_{tree}^N, R)$$

where:
$f_{tree}$ is the gem tree generation function,
$(F_{tree}^1, \ldots, F_{tree}^N)$ are the gem trees of the new player's first-degree friends, and
R is a random number.

When generating a gem tree, the game system solves the gem tree generation function by executing a method analogous to method 200 described above. The game system accesses the new player's out-of-game social network 150 and identifies his first-degree friends who have game accounts for the treasure hunting game. The game system then analyzes the in-game assets of the identified friends to determine the type of gem trees (i.e., key generators) they have. Once the tree types are identified, the game system can solve the pseudo-random function and generate the type of gem tree specified by the gem tree generation function. For example, the game system may adjust the numerical ranges corresponding to each of the gem trees types that map to the output of the gem tree generation function.

This embodiment may dynamically generate other types of in-game assets using other variants of the asset generation function. The gem tree generation function is merely an example of how one type of in-game asset is dynamically generated in the treasure hunting game.

Figure 4:
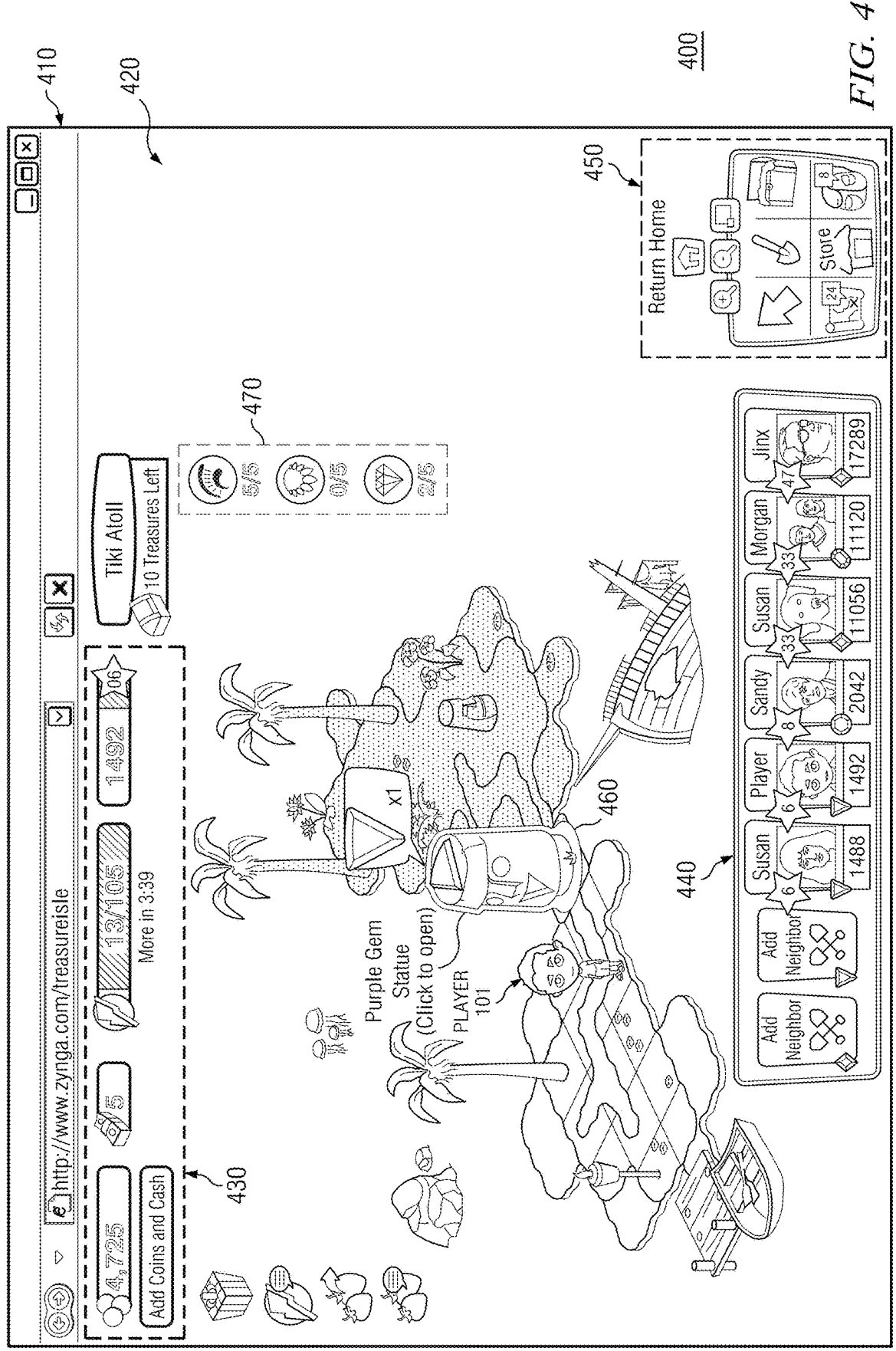
FIG. 4 shows an example of a user interface display for an online game.

FIG. 4 illustrates an example of a treasure island with a type of lock in the online treasure hunting game. Here, game interface 420 shows Player 101's player character on "Tiki Atoll," which is a specific instance of the game. Tiki Atoll is an example of a treasure island, which a player can visit, explore, and search for hidden treasure. In FIG. 4, Player 101 can explore the lower-left half of the island. However, egress to the shaded upper-right half of the island is blocked by purple gem statue 460, which is a type of lock. A lock is a type of in-game obstacle that has an asset requirement. The asset requirement to open a lock can include one or more gems of one or more types. For example, purple gem statue 460 has an asset requirement of one purple gem. If Player 101 clicks on the purple gem statute, his player character will move over to the statue and open it. This will deplete one purple gem from Player 101's inventory of in-game assets. Other types of locks may require multiple gems (e.g., 5 purple gems), and may require gems of multiple types (e.g., 2 purple gems and 1 blue gem). If the player has sufficient gems to satisfy the asset requirement, the player can open the lock and advance in the game. For example, if Player 101 spends one purple gem, purple gem statue 460 will open, allowing Player 101 access to the upper-right half of Tiki Atoll.

Each treasure island that a player visits may have one or more locks on the island. To determine the type of lock to generate on each treasure island, the game system can use a variant of the obstacle generation function, described previously, called the lock generation function. The variables of this lock generation function are the gem tree associated with the player and the gem trees associated with the first-degree friends in the player's social network. The lock generation function is a pseudo-random function that increases the probability of generating types of locks that have asset requirements that can be satisfied by the gems available from the gem tree associated with the player and the gem trees associated with the first-degree friends in the player's social network. For example, if neither Player 101 nor any of his friends have an orange gem tree, the lock generation function is less likely to generate a lock with an orange gem asset requirement. The following is an example algorithm the game engine could execute to determine the type of lock to generate a lock on a treasure island:

$$f_{lock} = f(P_{tree}^{101}, F_{tree}^1, \ldots, F_{tree}^N, R)$$

where:
$f_{lock}$ is the lock generation function,
$P_{tree}^{101}$ is Player 101's gem tree,
$(F_{tree}^1, \ldots, F_{tree}^N)$ are the gem trees of Player 101's friends, and
R is a random number.

When generating a lock, the game system solves the lock generation function by executing a method analogous to method 200 described above. The game system accesses the Player 101's in-game assets and identifies the type of gem tree associated with him. Similarly, the game system can identify the types of game trees associated with Player 101's first-degree in-game friends. Once the tree types are identified, the game system can solve the pseudo-random function and generates the type of lock specified by the lock generation function.

This embodiment may dynamically generate other types of in-game obstacles using other variants of the asset generation function. The lock generation function is merely an example of how one type of in-game obstacle is dynamically generated in the online treasure hunting game.

Systems and Methods

In the various embodiments, the computer-implemented game may be a text-based or turn-based game implemented as a series of web pages that are returned after a user selects one or more actions to perform. In other implementations, the computer-implemented game may be an animated or rendered game executable as a stand-alone application or within the context of a web page or other structured document. In one implementation, the computer-implemented game can be implemented using FLASH®-based technologies. For example, the game can be fully or partially implemented as a SWF object that is embedded in a web page and executable by a FLASH® media player plug-in. In various example embodiments, one or more described webpages may be associated with a networking system or networking service. However, alternate embodiments may have application to the retrieval and rendering of structured documents hosted by any type of network addressable resource or web site. Additionally, as used herein, a "user" may be an individual, a group, or an entity (such as a business or third party application).

Figure 5:
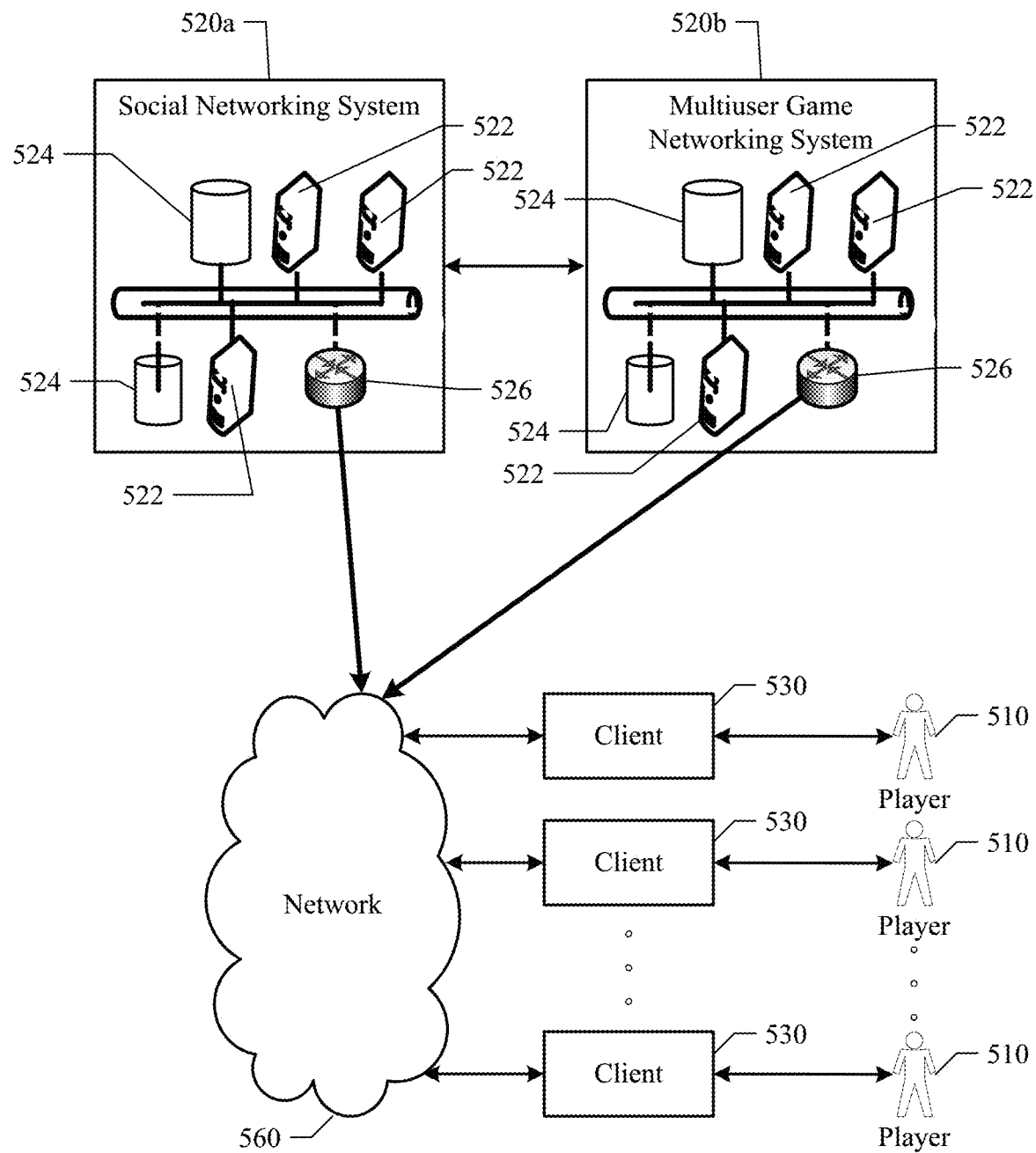
FIG. 5 illustrates an example network environment.

Particular embodiments may operate in a wide area network environment, such as the Internet, including multiple network addressable systems. FIG. 5 illustrates an example network environment, in which various example embodiments may operate. Network cloud 560 generally represents one or more interconnected networks, over which the systems and hosts described herein can communicate. Network cloud 560 may include packet-based wide area networks (such as the Internet), private networks, wireless networks, satellite networks, cellular networks, paging networks, and the like. As FIG. 5 illustrates, particular embodiments may operate in a network environment comprising social networking system 520a, multiuser game networking system 520b, and one or more client devices 530. However, a social networking system separate from the multiuser game networking system is not necessary. It is possible for the systems to be combined, such that the social networking system and the multiuser game networking system are part of the same system. Consequently, hereinafter, social networking systems 520a and multiuser game networking system 520b may be referred to simply as networking system 520. Client devices 530 are operably connected to the network environment via a network service provider, a wireless carrier, or any other suitable means.

In one example embodiment, networking system 520 comprises computing systems that allow users to communicate or otherwise interact with each other and access content, such as a multiuser online game, game player profiles, social network profiles, and other content as described herein. Networking system 520 is a network addressable system that, in various example embodiments, comprises one or more physical servers 522 and data stores 524. The one or more physical servers 522 are operably connected to computer network 560 via, by way of example, a set of routers and/or networking switches 526. In an example embodiment, the functionality hosted by the one or more physical servers 522 may include web or HTTP servers, FTP servers, as well as, without limitation, web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Flash, ActionScript, Asynchronous JavaScript and XML (AJAX), and the like.

Physical servers 522 may host functionality directed to the operations of networking system 520. By way of example, networking system 520 may host a website that allows one or more users, at one or more client devices 530, to access a multiuser online game, access an online social network, as well as communicate and interact with one another via the website. Hereinafter servers 522 may be referred to as server 522, although server 522 may include numerous servers hosting, for example, networking system 520, as well as other content distribution servers, data stores, and databases. Data store 524 may store content and data relating to, and enabling, operation of the networking system as digital data objects. A data object, in particular implementations, is an item of digital information typically stored or embodied in a data file, database or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 524 corresponds to one or more of a variety of separate and integrated databases, such as relational databases and object-oriented databases, that maintain information as an integrated collection of logically related records or files stored on one or more physical systems. Structurally, data store 524 may generally include one or more of a large class of data storage and management systems. In particular embodiments, data store 524 may be implemented by any suitable physical system(s) including components, such as one or more database servers, mass storage media, media library systems, storage area networks, data storage clouds, and the like. In one example embodiment, data store 524 includes one or more servers, databases (e.g., MySQL), and/or data warehouses.

Data store 524 may include data associated with different networking system 520 users and/or client devices 530. In particular embodiments, the networking system 520 maintains a user profile for each user of the system 520. User profiles include data that describe the users of a network, which may include, for example, proper names (first, middle and last of a person, a trade name and/or company name of a business entity, etc.), biographic, demographic, and other types of descriptive information, such as work experience, educational history, hobbies or preferences, geographic location, and additional descriptive data. By way of example, user profiles may include a user's birthday, relationship status, city of residence, and the like. The system 520 may further store data describing one or more relationships between different users. The relationship information may indicate users who have similar or common work experience, group memberships, hobbies, or educational history. A user profile may also include privacy settings governing access to the user's information is to other users.

Client device 530 is generally a computer or computing device including functionality for communicating (e.g., remotely) over a computer network. Client device 530 may be a desktop computer, laptop computer, personal digital assistant (PDA), in- or out-of-car navigation system, smart phone or other cellular or mobile phone, or mobile gaming device, among other suitable computing devices. Client device 530 may execute one or more client applications, such as a web browser (e.g., Microsoft Internet Explorer, Mozilla Firefox, Apple Safari, Google Chrome, and Opera, etc.), to access and view content over a computer network. In particular implementations, the client applications allow a user of client device 530 to enter addresses of specific network resources to be retrieved, such as resources hosted by networking system 520. These addresses can be Uniform Resource Locators, or URLs. In addition, once a page or other resource has been retrieved, the client applications may provide access to other pages or records when the user "clicks" on hyperlinks to other resources. By way of example, such hyperlinks may be located within the web pages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating web pages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications and other objects that can be embedded within the page. Generally, a webpage may be delivered to a client as a static document, however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

Networking system 520 may include a multitude of features with which users at remote clients 530 may interact during user sessions. In particular embodiments, these features may be implemented as web applications and may utilize JavaScript and CSS resources requested from servers 522 as well as other external servers or data stores. The web applications or resources may be embedded in various underlying or base web pages served to remote clients, such as in frames or iFrames, sections or "divs" and the like. By way of example, a computer-implemented game may be implemented as a FLASH object that is embedded into an HTML document and executable within the context of a client application, such as a browser. In one such implementation, a game hosted by game networking system 520b may be embedded into web pages served by social networking system 520a. In other implementations, game networking system 520b may serve web pages, including the embedded game application, directly to users.

In particular embodiments, the networking system 520 maintains in data store 524 a number of objects for the different kinds of items with which a user may interact while accessing networking system 520. In one example embodiment, these objects include game network user profiles, social network user profiles, application objects, and message objects (such as for wall posts, emails and other messages). In one embodiment, an object is stored by the system 520 for each instance of its associated item. These objects and the actions discussed herein are provided for illustration purposes only, and it can be appreciated that an unlimited number of variations and features can be provided on a networking system 520.

When a user at a client device (e.g., client device 530) desires to view a particular web page (hereinafter also referred to as target structured document) hosted by networking system 520, the user's web browser, or other document rendering engine or suitable client application, formulates and transmits a request to networking system 520. The request generally includes a URL or other document identifier as well as metadata or other information. By way of example, the request may include information identifying the user, such as a user ID, as well as information identifying or characterizing the web browser or operating system running on the user's client computing device 530. The request may also include location information identifying a geographic location of the user's client device or a logical network location of the user's client device. The request may also include a timestamp identifying when the request was transmitted.

Figure 6:
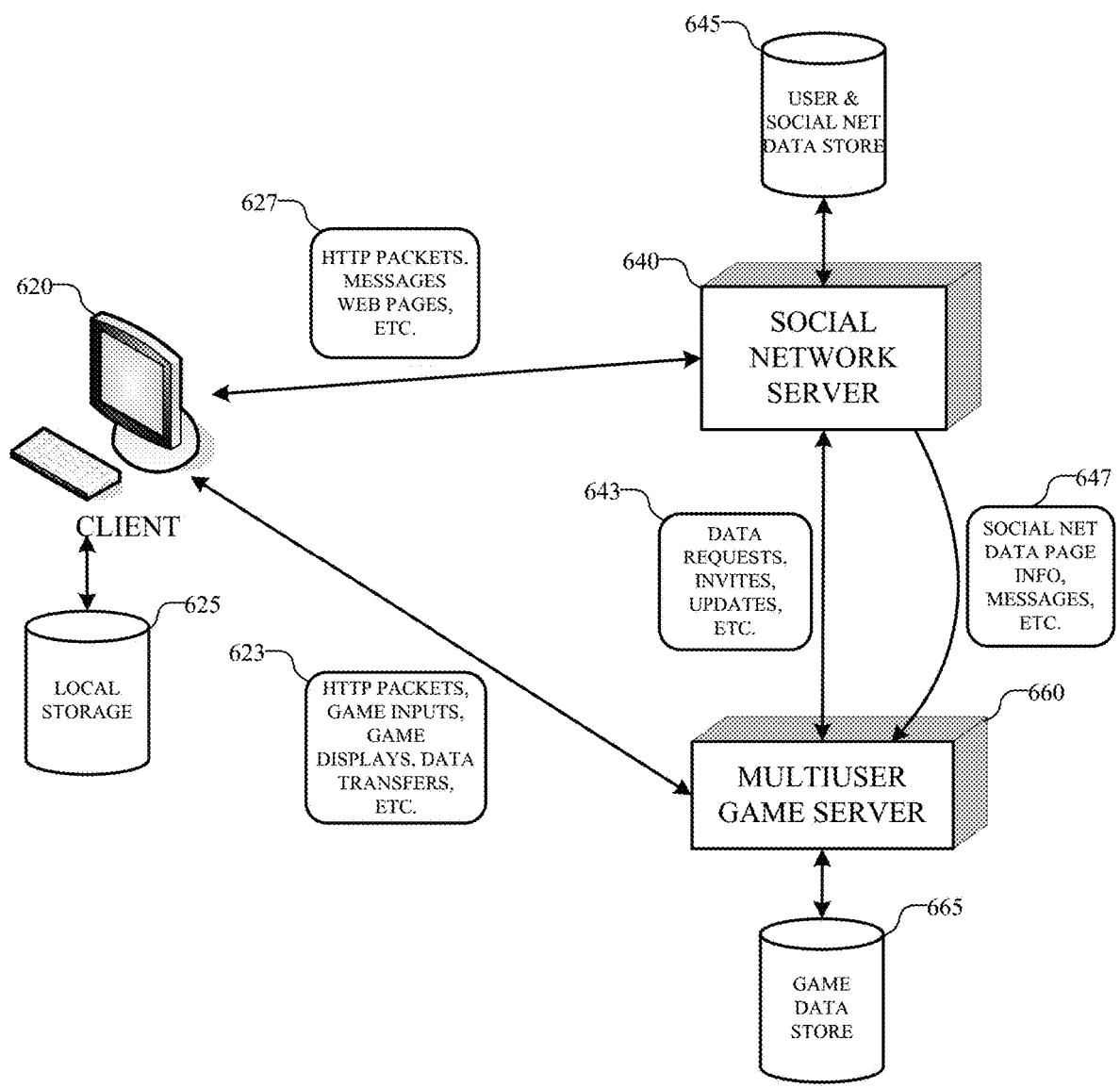
FIG. 6 illustrates a schematic of a system and data flow.

FIG. 6 depicts a schematic of system 600 and data flow between the components of system 600 for operating an online multiuser game. System 600 can include a client system 620, a social network server 640 and multiuser game server 660. Client system 620, social network server 640 and multiuser game server 660 can each have a corresponding data store such as local storage medium 625, user and social network storage medium 645 and game data storage medium 665, respectively. Client system 620 can communicate with social network server 640 to receive web pages, messages, etc. Additionally, client system 620 can transmit data to and receive data from 623 (including game inputs, team displays, data transfers, etc.) multiuser game server 660. In a similar fashion, multiuser game server 660 and social network server 640 can communicate HTTP packets 643 including data requests, invites, updates, etc. with social network server 640. At some other time, or at the same time, social network server 640 can communicate social network data, page info, messages, etc. data 647 with multiuser game server 660. As mentioned above, communication between client system 620, social network server 640 and multiuser game server 660 can occur over any appropriate electronic communication medium.

Figure 7:
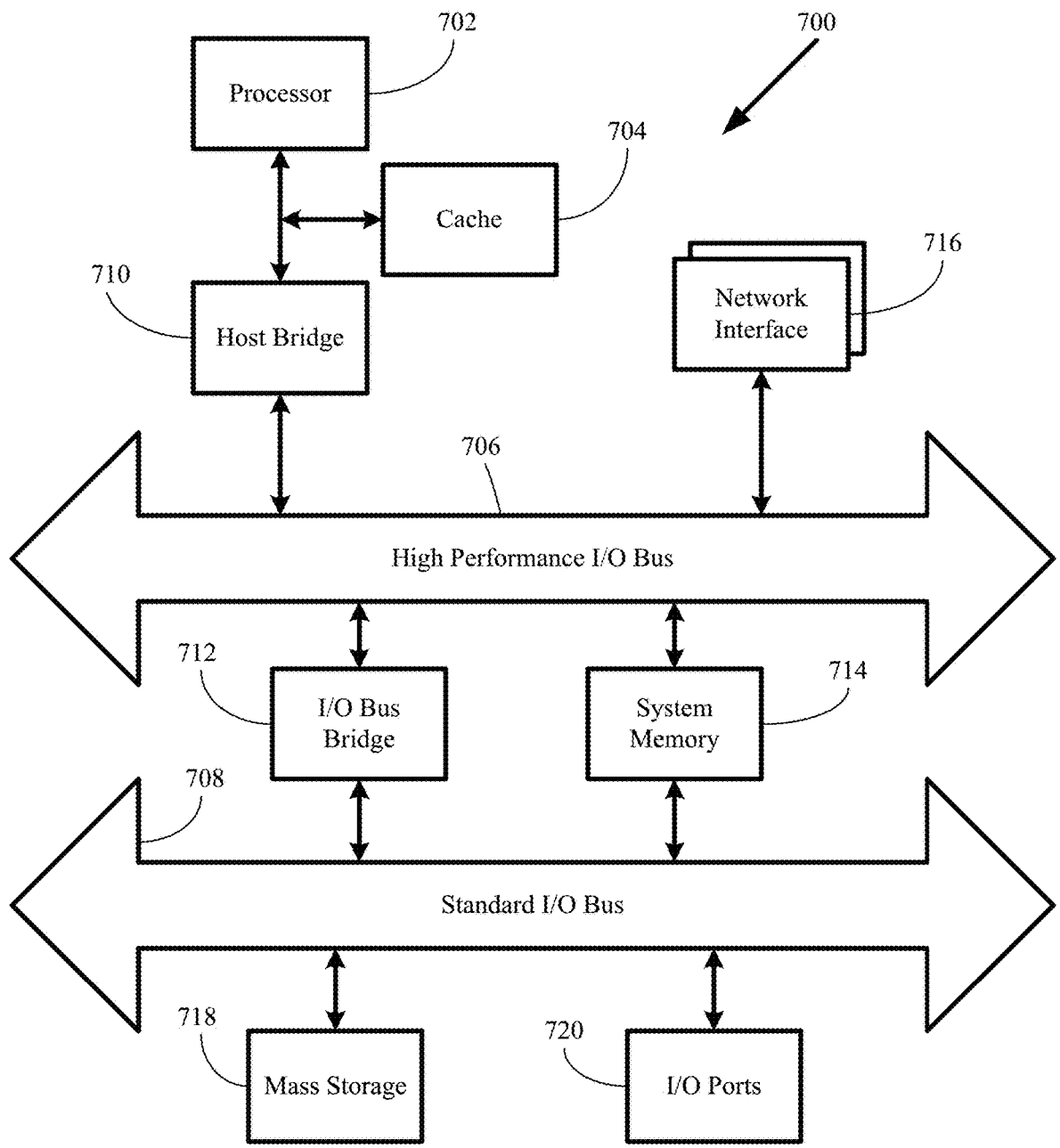
FIG. 7 illustrates an example computer system architecture.

FIG. 7 illustrates an example computing system architecture, which may be used to implement a server 522 or a client device 530 (or each node of a distributed computing system). In one embodiment, hardware system 700 comprises a processor 702, a cache memory 704, and one or more executable modules and drivers, stored on a tangible computer readable medium, directed to the functions described herein. Additionally, hardware system 700 may include a high performance input/output (I/O) bus 706 and a standard I/O bus 708. A host bridge 710 may couple processor 702 to high performance I/O bus 706, whereas I/O bus bridge 712 couples the two buses 706 and 708 to each other. A system memory 714 and one or more network/communication interfaces 716 couple to bus 706. Hardware system 700 may further include video memory (not shown) and a display device coupled to the video memory. Mass storage 718, and I/O ports 720 couple to bus 708. Hardware system 700 may optionally include a keyboard and pointing device, and a display device (not shown) coupled to bus 708. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 700 are described in greater detail below. In particular, network interface 716 provides communication between hardware system 700 and any of a wide range of networks, such as an Ethernet (e.g., IEEE 802.3) network, a backplane, etc. Mass storage 718 provides permanent storage for the data and programming instructions to perform the above-described functions implemented in the servers 522, whereas system memory 714 (e.g., DRAM) provides temporary storage for the data and programming instructions when executed by processor 802.

I/O ports 720 are one or more serial and/or parallel communication ports that provide communication between additional peripheral devices, which may be coupled to hardware system 700.

Hardware system 700 may include a variety of system architectures; and various components of hardware system 700 may be rearranged. For example, cache 704 may be on-chip with processor 702. Alternatively, cache 704 and processor 702 may be packed together as a "processor module," with processor 702 being referred to as the "processor core." Furthermore, certain embodiments may not require nor include all of the above components. For example, the peripheral devices shown coupled to standard I/O bus 708 may couple to high performance I/O bus 706. In addition, in some embodiments, only a single bus may exist, with the components of hardware system 700 being coupled to the single bus. Furthermore, hardware system 700 may include additional components, such as additional processors, storage devices, or memories.

An operating system manages and controls the operation of hardware system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other implementations are possible. For example, the functions described herein may be implemented in firmware or on an application specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosures herein. The term "processing system" refers to a single processing device or a group of inter-operational processing devices. Some examples of processing devices are integrated circuits and logic circuitry. Those skilled in the art are familiar with instructions, computers, and storage media.

MISCELLANEOUS

One or more features from any embodiment may be combined with one or more features of any other embodiment without departing from the scope of the disclosure.

A recitation of "a", "an," or "the" is intended to mean "one or more" unless specifically indicated to the contrary.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A method comprising:
  accessing, by a hardware system comprising at least one processor and a memory, a first game account of a player of a game, the game being a computer-implemented multiplayer game, in which multiple players each have a respective set of in-game assets, each in-game asset being a virtual object usable during gameplay to overcome one or more associated in-game obstacles for advancing within the game;
  analysing, by the hardware system, in-game assets associated with the first game account;
  accessing, by the hardware system, social network information associated with the player, wherein the social network information identifies one or more friends in a social network of the player;
  retrieving, by the hardware system, game account information of the one or more friends in the social network of the player, wherein the game account information comprises in-game asset information that indicates, for each of the one or more friends, a respective set of in-game assets for the game;
  accessing, by the hardware system, game state information for a game instance of the game associated with the player, the game state information including:
  a specific in-game obstacle to be overcome by the player in the game instance; and
  an asset requirement for the specific in-game obstacle, the asset requirement identifying a plurality of in-game assets which are together required for overcoming the specific in-game obstacle;
  identifying, by the hardware system, with respect to a particular in-game asset forming part of the asset requirement for the specific in-game obstacle, that the in-game asset information for the one or more friends indicates that the particular in-game asset is present in the respective set of in-game assets of at least one of the one or more friends;
  in an automated operation performed by the hardware system based at least in part on the in-game asset information of the one or more friends and based at least in part on the asset requirement for the specific in-game obstacle identified by the game state information, generating, for the player, an in-game asset using a pseudo-random function that is structured to generate in-game assets that exclude any particular in-game asset identified as forming part of the asset requirement and identified as being included in the in-game asset information of the one or more friends; and displaying the in-game asset in a game user interface for the game instance, making the in-game asset available to the player.

2. The method of claim 1, further comprising:
retrieving in-game asset information of the player; and
wherein generating the in-game asset for the player is further based on current in-game assets of the player.

3. The method of claim 2, wherein:
the game state information comprises game parameters not related to in-game assets; and
wherein the generating of the in-game asset for the player is further based on the game state information not related to in-game assets.

4. The method of claim 1, wherein the pseudo-random function comprises one or more variables based on:
the in-game assets of the one or more friends;
a subset of the in-game assets of the one or more friends that can be transferred as a gift to the player; and
a random variable.

5. A non-transitory computer-readable storage medium comprising instructions that, when executed by at least one processor of a hardware system, cause the hardware system to perform operations comprising:
accessing a first game account of a player of a game, the game being a computer-implemented multiplayer game, in which multiple players each have a respective set of in-game assets, each in-game asset being a virtual object usable during gameplay to overcome one or more associated in-game obstacles for advancing within the game;
analysing in-game assets associated with the first game account;
accessing social network information associated with the player, wherein the social network information identifies one or more friends in a social network of the player;
retrieving game account information of the one or more friends in the social network of the player, wherein the game account information comprises in-game asset information that indicates, for each of the one or more friends, a respective set of in-game assets for the game;
accessing game state information for a game instance of the game associated with the player, the game state information including:
a specific in-game obstacle to be overcome by the player in the game instance; and
an asset requirement for the specific in-game obstacle, the asset requirement identifying a plurality of in-game assets which are together required for overcoming the specific in-game obstacle;
identifying, with respect to a particular in-game asset forming part of the asset requirement for the specific in-game obstacle, that the in-game asset information for the one or more friends indicates that the particular in-game asset is present in the respective set of in-game assets of at least one of the one or more friends;
based at least in part on the in-game asset information of the one or more friends and based at least in part on the asset requirement for the specific in-game obstacle identified by the game state information, generating, for the player, an in-game asset using a pseudo-random function that is structured to generate in-game assets that exclude any particular in-game asset identified as being included in the in-game asset information of the one or more friends; and
displaying the in-game asset in a game user interface for the game instance, making the in-game asset available to the player.

6. A system comprising:
a social network server to maintain social network information associated with a player of a game, the social network information identifying one or more friends in a social network of the player; and
a multiuser game server coupled to the social network server, the multiuser game server being configured to implement the game over a distributed computer network, the game being a computer-implemented multiplayer game, in which multiple players each have a respective set of in-game assets, each in-game asset being a virtual object usable during gameplay to overcome one or more associated in-game obstacles for advancing within the game, the multi-user game server comprising at least one processor and a memory having stored thereon computer-readable instructions that configure the at least one processor to perform automated operations comprising:
accessing a first game account of the player for the game;
analysing in-game assets associated with the first game account;
accessing the social network information associated with the player;
retrieving game account information of the one or more friends in the social network of the player, wherein the game account information comprises in-game asset information that indicates, for each of the one or more friends, a respective set of in-game assets for the game;
accessing game state information for a game instance of the game associated with the player, the game state information including:
a specific in-game obstacle to be overcome by the player in the game instance; and
an asset requirement for the specific in-game obstacle, the asset requirement identifying a plurality of in-game assets which are together required for overcoming the specific in-game obstacle;
identifying, with respect to a particular in-game asset forming part of the asset requirement for the specific in-game obstacle, that the in-game asset information for the one or more friends indicates that the particular in-game asset is present in the respective set of in-game assets of at least one of the one or more friends;
based at least in part on the in-game asset information of the one or more friends and based at least in part on the asset requirement for the specific in-game obstacle identified by the game state information, generating, for the player, an in-game asset using a pseudo-random function that is structured to generate in-game assets that exclude any particular in-game asset identified 4987 as forming part of the asset requirement and identified as being included in the in-game asset information of the one or more friends; and
displaying the in-game asset in a game user interface for the game instance, making the in-game asset available to the player.

7. The non-transitory computer-readable storage medium of claim 5 further comprising instructions that, when executed by the at least one processor of the hardware system, cause the hardware system to perform further operations comprising:
retrieving in-game asset information of the player; and
generating the in-game asset for the player based at least in part on current in-game assets of the player.

8. The non-transitory computer-readable storage medium of claim 7, wherein the instructions are for performance of the operations such that:
- the game state information includes game parameters not related to in-game assets; and
- the generating of the in-game asset for the player is further based on the game state information not related to in-game assets.

9. The non-transitory computer-readable storage medium of claim 5 wherein the pseudo-random function comprises one or more variables based on:
- the in-game assets of the one or more friends;
- a subset of the in-game assets of the one or more friends that can be transferred as a gift to the player; and
- a random variable.

* * * * *

UNITED STATES PATENT AND TRADEMARK OFFICE
CERTIFICATE OF CORRECTION

| | |
|---|---|
| PATENT NO. | : 11,232,671 B1 |
| APPLICATION NO. | : 12/873010 |
| DATED | : January 25, 2022 |
| INVENTOR(S) | : Mahajan et al. |

It is certified that error appears in the above-identified patent and that said Letters Patent is hereby corrected as shown below:

In the Specification

In Column 16, Line 67, delete "802." and insert --702.-- therefor

In the Claims

In Column 20, Line 54, in Claim 6, before "as", delete "4987"

Signed and Sealed this
Twenty-eighth Day of June, 2022

Katherine Kelly Vidal
*Director of the United States Patent and Trademark Office*